US012606009B2

(12) United States Patent

Park et al.

(10) Patent No.: US 12,606,009 B2

(45) Date of Patent: Apr. 21, 2026

(54) ACTIVE AIR FLAP

(71) Applicant: Hanon Systems, Daejeon (KR)

(72) Inventors: Sung-Wook Park, Daejeon (KR); Ok Ryul Min, Daejeon (KR); Won Sub So, Daejeon (KR); Neung Kwon, Daejeon (KR); Yong Min Jo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 548 days.

(21) Appl. No.: 18/025,067

(22) PCT Filed: Sep. 28, 2021

(86) PCT No.: PCT/KR2021/013177
§ 371 (c)(1),
(2) Date: Mar. 7, 2023

(87) PCT Pub. No.: WO2022/071709

PCT Pub. Date: Apr. 7, 2022

(65) Prior Publication Data

US 2023/0331079 A1 Oct. 19, 2023

(30) Foreign Application Priority Data

Sep. 29, 2020 (KR) ........................ 10-2020-0127438
Sep. 27, 2021 (KR) ........................ 10-2021-0127233

(51) Int. Cl.
B60K 11/08 (2006.01)
B60K 11/06 (2006.01)

(52) U.S. Cl.
CPC ............ B60K 11/085 (2013.01); B60K 11/06 (2013.01)

(58) Field of Classification Search
CPC ........ B60K 11/085; B60K 11/06; B60K 11/08
See application file for complete search history.

(56) References Cited

U.S. PATENT DOCUMENTS 8,118,124 B2 * 2/2012 Shin .......................... F01P 7/12
454/75
8,708,078 B2 * 4/2014 Charnesky ........... B60K 11/085
49/77.1

(Continued)

FOREIGN PATENT DOCUMENTS

CN 203349457 12/2013
DE 102017119098 2/2019

(Continued)

OTHER PUBLICATIONS

English translation of official Action issued May 13, 2025 in related German Patent Application No. 112021003966.0, 14 pgs.

(Continued)

*Primary Examiner* — James M Dolak

(74) *Attorney, Agent, or Firm* — NORTON ROSE FULBRIGHT US LLP

(57) ABSTRACT

The present invention relates to an active air flap comprising: a door including a barrier plate formed in a plate form, a pair of extension portions respectively extending in the thickness direction from both sides of the barrier plate in the longitudinal direction, and a pair of rotational coupling portions respectively formed at free ends of the pair of extension portions; and torsion prevention members disposed at positions corresponding to the pair of rotational coupling portions, and having one longitudinal end coupled to one extension portion and the other longitudinal end coupled to the other extension portion, whereby sufficient rigidity of the door may be secured such that the active air flap may prevent door twisting and abnormal door opening caused by wind pressure during high-speed driving of a vehicle.

18 Claims, 15 Drawing Sheets

(56)                 References Cited

U.S. PATENT DOCUMENTS

| | | | | |
|---|---|---|---|---|
| 8,893,836 | B2 * | 11/2014 | Asano | B60K 11/085 |
| | | | | 180/68.3 |
| 9,446,660 | B2 * | 9/2016 | Asai | B60K 11/085 |
| 9,643,482 | B2 * | 5/2017 | Yoo | B60K 11/085 |
| 9,676,269 | B2 * | 6/2017 | Jeong | B60K 11/085 |
| 9,902,256 | B2 * | 2/2018 | Yamamoto | B60K 11/04 |
| 10,024,560 | B2 * | 7/2018 | Schneider | F24F 13/1426 |
| 10,093,173 | B1 | 10/2018 | Frayer et al. | |
| 10,100,707 | B2 * | 10/2018 | Wolf | B60K 11/085 |
| 10,160,309 | B2 * | 12/2018 | Schwarz | B60K 11/085 |
| 10,183,573 | B1 * | 1/2019 | Klop | B60K 11/085 |
| 10,293,681 | B2 * | 5/2019 | Vacca | B60K 11/085 |
| 10,323,852 | B2 * | 6/2019 | Takanaga | B60K 11/085 |
| 11,142,060 | B2 * | 10/2021 | Gallagher Gil | B60K 11/085 |
| 11,370,295 | B2 * | 6/2022 | Schneider | B60K 11/04 |
| 11,560,048 | B2 * | 1/2023 | Kim | F01P 7/10 |
| 11,701,842 | B2 * | 7/2023 | Da Costa Pito | B60K 11/085 |
| | | | | 180/68.1 |
| 11,891,125 | B2 * | 2/2024 | Byun | B60K 11/085 |
| 12,280,654 | B2 * | 4/2025 | Manhire | B60K 11/04 |
| 12,304,571 | B2 * | 5/2025 | Byun | B60R 19/52 |
| 12,365,404 | B2 * | 7/2025 | Byun | B60R 19/52 |
| 12,391,112 | B2 * | 8/2025 | Kim | B60K 11/085 |
| 12,409,724 | B2 * | 9/2025 | Park | B60K 11/085 |
| 12,420,628 | B2 * | 9/2025 | Jeong | B60K 11/085 |
| 12,479,288 | B2 * | 11/2025 | Byun | B60K 11/04 |
| 12,485,744 | B2 * | 12/2025 | Pütz | B60K 11/085 |
| 12,508,897 | B2 * | 12/2025 | Yoon | B60K 11/085 |
| 12,515,517 | B2 * | 1/2026 | König | B60K 11/085 |
| 12,528,348 | B2 * | 1/2026 | Singh | B60K 11/085 |
| 2013/0223980 | A1 * | 8/2013 | Pastrick | F01D 5/00 |
| | | | | 415/1 |
| 2019/0366652 | A1 | 12/2019 | Da Costa Pito et al. | |

FOREIGN PATENT DOCUMENTS

| | | |
|---|---|---|
| JP | H1137536 A | 2/1999 |
| JP | 2016068738 A | 5/2016 |
| JP | 2019077246 A | 5/2019 |
| JP | 2020514169 | 5/2020 |
| KR | 20090070002 A | 7/2009 |
| KR | 101894452 B1 | 9/2018 |
| WO | 2015003597 A1 | 1/2015 |

OTHER PUBLICATIONS

Official Action issued Mar. 15, 2025 in related Korean Patent Application No. 10- 2021-0127233, 7 pgs.

* cited by examiner

ACTIVE AIR FLAP

CROSS REFERENCE TO RELATED APPLICATIONS

This application is a national phase under 35 U.S.C. § 371 of International Application No. PCT/KR2021/013177 filed on Sep. 28, 2021, which claims the benefit of priority from Korean Patent Application Nos. 10-2021-0127233 filed on Sep. 27, 2021 and 10-2020-0127438 filed on Sep. 29, 2020. The entire contents of these applications are incorporated herein by reference in their entirety.

TECHNICAL FIELD

The present invention relates to an active air flap controlling an amount of cooled air introduced into an engine room of a vehicle.

BACKGROUND ART

In recent years, the number of electrical parts in a vehicle such as an electric vehicle has been increased, thus requiring improved performance of a heat exchanger. Accordingly, an opening and an active air flap controlling a level of opening and closing of the opening each tend to have a greater length to increase an amount of air introduced through the opening positioned at the front of the vehicle. In addition, a door of the active air flap may be designed to have a smaller thickness to minimize air resistance when the door is opened, which results in insufficient twist rigidity of the door.

In general, as shown in FIG. 1, a bumper 20 may be installed on a carrier 10 of a vehicle, and the bumper 20 may include an opening 21 for outside air to be smoothly introduced into a cooling module 30 formed by modularizing heat exchangers positioned in the engine room. In addition, an active air flap 40 may be positioned in the opening 21 of the bumper 20 to control an amount of outside air introduced through the opening 21 for improved fuel efficiency of the vehicle.

Referring to FIG. 2, the active air flap 40 may include a first air duct 41, a door 42, a second air duct 43, and an actuator 44. Here, the active air flap 40 may serve to improve the aerodynamics and fuel efficiency of the vehicle by blocking the opening 21 by closing the door 42 when the engine is initially started and until a temperature of the engine rises within a predetermined range, assist in cooling the engine or the like by opening the opening 21 by opening the door 42 when the engine reaches the predetermine temperature or more, and reduce air resistance by appropriately adjusting an air flow rate through an angle adjustment of the door 42 during high-speed driving of the vehicle.

However, in the active air flap 40 of this structure, the door 42 may have a length (or long side) in the left-right direction greater than a width (or short side) in the vertical direction, and the actuator may be coupled to only a rotating shaft positioned on one side of the door 42 in the longitudinal direction.

That is, rotation of only one side of the door 42 in the longitudinal direction may be restrained by the actuator, and accordingly, the door 42 may not be deformed or abnormally opened by wind pressure during the high-speed driving of the vehicle. On the other hand, the other side of the door 42 in the longitudinal direction may not be restrained, the rotating shaft may be rotatably coupled to the air duct 43, and the door 42 may thus be twist-deformed to be abnormally opened by the wind pressure during the high-speed driving of the vehicle.

Accordingly, the active air flap is required to employ a door securing sufficient twist rigidity to reduce the deformation of the door and air flow even during the high-speed driving of the vehicle.

RELATED ART DOCUMENT

Patent Document

KR 10-1894452 B1 (Aug. 28, 2018)

DISCLOSURE

Technical Problem

An object of the present invention is to provide an active air flap which may prevent the deformation or abnormal opening of a door of the active air flap that is caused by wind pressure during high-speed driving of a vehicle.

Technical Solution

In one general aspect, an active air flap includes: a door including a barrier part capable of blocking a flow of air introduced from the front of a vehicle, and a pair of rotating shafts respectively positioned at both free ends of the barrier part in the longitudinal direction; and a twist prevention member disposed to correspond to the pair of rotating shafts, and having one end in the longitudinal direction that is coupled to one side of the barrier part in the longitudinal direction and the other end in the longitudinal direction that is coupled to the other side of the barrier part in the longitudinal direction.

In addition, the door and the twist prevention member may be separately provided, and the door and the twist prevention member may be able to be disassembled from each other or assembled to each other.

In addition, an insertion part having a polygonal shape may be positioned at each of two ends of a body part of the twist prevention member in the longitudinal direction, a coupling groove having a shape corresponding to that of the insertion part may be positioned in each of opposite surfaces of both sides of the barrier part of the door in the longitudinal direction, and the insertion part of the twist prevention member may be inserted into and coupled to the coupling groove.

In addition, the body part of the twist prevention member may have an outer diameter greater than that of the insertion part.

In addition, a guide rib may protrude from the insertion part of the twist prevention member, a guide groove corresponding to the guide rib may be positioned in the coupling groove of the barrier part, and the guide rib may be inserted into and coupled to the guide groove.

In addition, the twist prevention member may include a plurality of transverse ribs extending in the longitudinal direction and a plurality of longitudinal ribs connecting the plurality of transverse ribs to each other.

In addition, the barrier part of the door may include a barrier plate having a plate shape and a pair of extension parts respectively extending in the thickness direction from both sides of the barrier plate in the longitudinal direction, and the rotating shaft may be positioned at each free end of the pair of extension parts.

In addition, when the door is blocked, the twist prevention member may be disposed behind the barrier plate while being spaced apart therefrom in an air flow direction of a vehicle.

In addition, an insertion part having a polygonal shape may be positioned at each of two ends of the twist prevention member in the longitudinal direction, a coupling groove having a shape corresponding to that of the insertion part may be positioned in each of opposite surfaces of the extension parts positioned on both sides of the door in the longitudinal direction, and the insertion part of the twist prevention member may be inserted into and coupled to the coupling groove of the extension part.

In addition, the coupling groove may be positioned in the surface that is opposite to the position of the rotating shaft in the longitudinal direction.

In addition, the door and the twist prevention member may each be made of a resin material and injection-molded to be separable from each other.

In addition, wherein a distance between the extension parts opposing each other at a position where the coupling grooves of the extension parts positioned on both the sides of the door in the longitudinal direction are positioned may be smaller than a length of the body part of the twist prevention member, and the pair of extension parts may be spread outward in the longitudinal direction, the twist prevention member may then be inserted for the insertion part to be inserted into the coupling groove, the door may then be restored to its original shape by elasticity, and both sides of the twist prevention member in the longitudinal direction may thus be coupled and fixed to the pair of extension parts.

In addition, the pair of extension parts of the door may have a distance between the pair of extension parts that is gradually smaller from its fixed end connected to the barrier plate to its free end.

In addition, the door may include a reinforcing rib positioned inside a portion where the barrier plate and the extension part meet each other and connecting the barrier plate and the extension part with each other.

In addition, a plurality of first ribs extending in the longitudinal direction and a second rib connected to the plurality of first ribs may protrude from an inner surface of the barrier plate of the door in the thickness direction.

In addition, the active air flap may further include an air duct which has an inside through which air passes, in which the door and the twist prevention member are positioned, to which the pair of rotating shafts of the door is rotatably coupled, and which guides introduced air.

In addition, the active air flap may further include an actuator fixed to the air duct, connected to the rotating shaft of the door, and operating to pivot the door for the air duct to be opened or closed.

In addition, one of the pair of rotating shafts that is positioned on one side of the barrier part in the longitudinal direction may be coupled to and restrained by the actuator, and the rotating shaft positioned on the other side of the barrier part in the longitudinal direction may be able to freely rotate.

In addition, the active air flap may further include: a permanent magnet coupled to the door while being spaced apart from the rotating shaft of the door; and an electromagnet disposed adjacent to the permanent magnet and fixed to the air duct.

In addition, the actuator may be coupled to the rotating shaft positioned on one side of the door in the longitudinal direction or one side of the air duct in the longitudinal direction, and the permanent magnet and electromagnet may be disposed on the other side of the door or air duct in the longitudinal direction and coupled thereto.

Advantageous Effect

The active air flap of the present invention may secure the sufficient rigidity of the door to prevent the twist deformation or abnormal opening of the door that is caused by the wind pressure during the high-speed driving of the vehicle.

BEST MODE

Hereinafter, an active air flap of the present invention having the above-described configuration is described in detail with reference to the accompanying drawings.

First Embodiment

Figure 1:
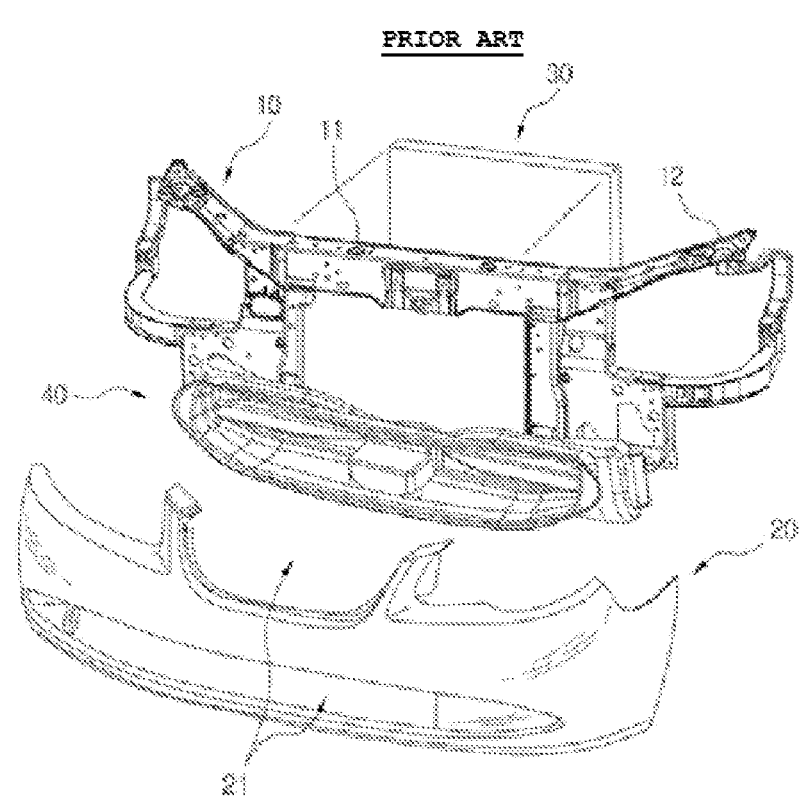
FIG. 1 is an exploded perspective view showing a front-end module including a prior active air flap.
Figure 2:
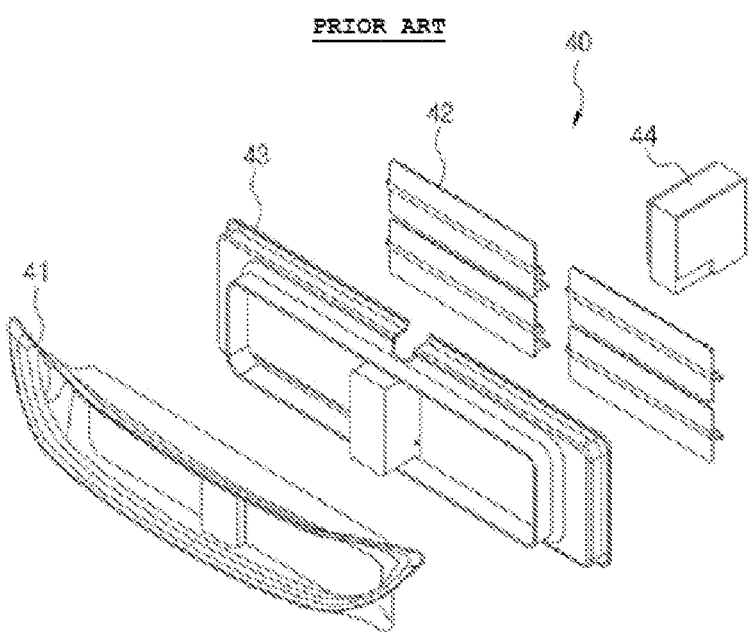
FIG. 2 is an exploded perspective view showing an example of the prior active air flap.
Figure 3:
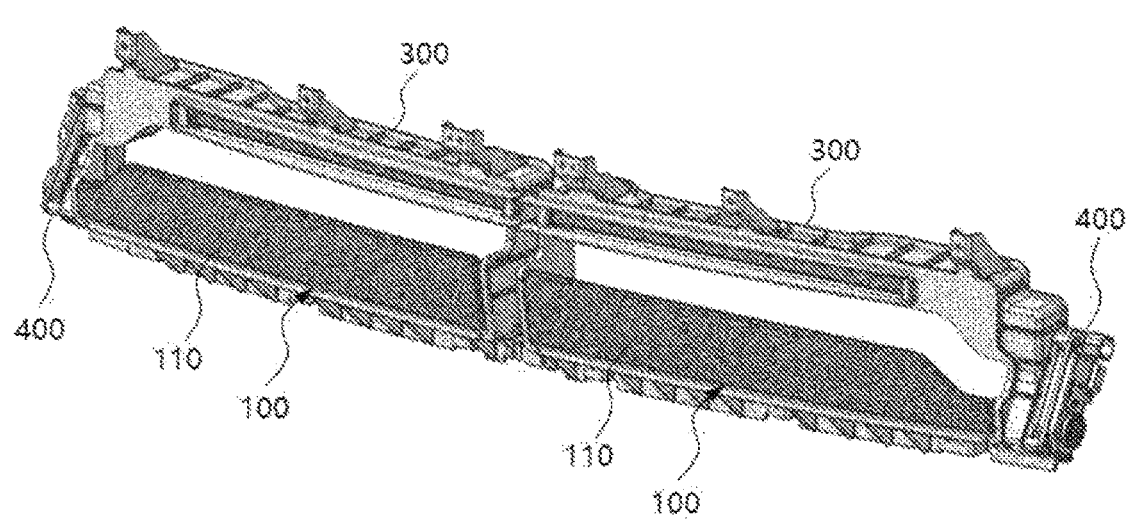
FIG. 3 is a perspective view showing a pair of active air flaps disposed symmetrically to each other according to an embodiment of the present invention.
Figure 4:
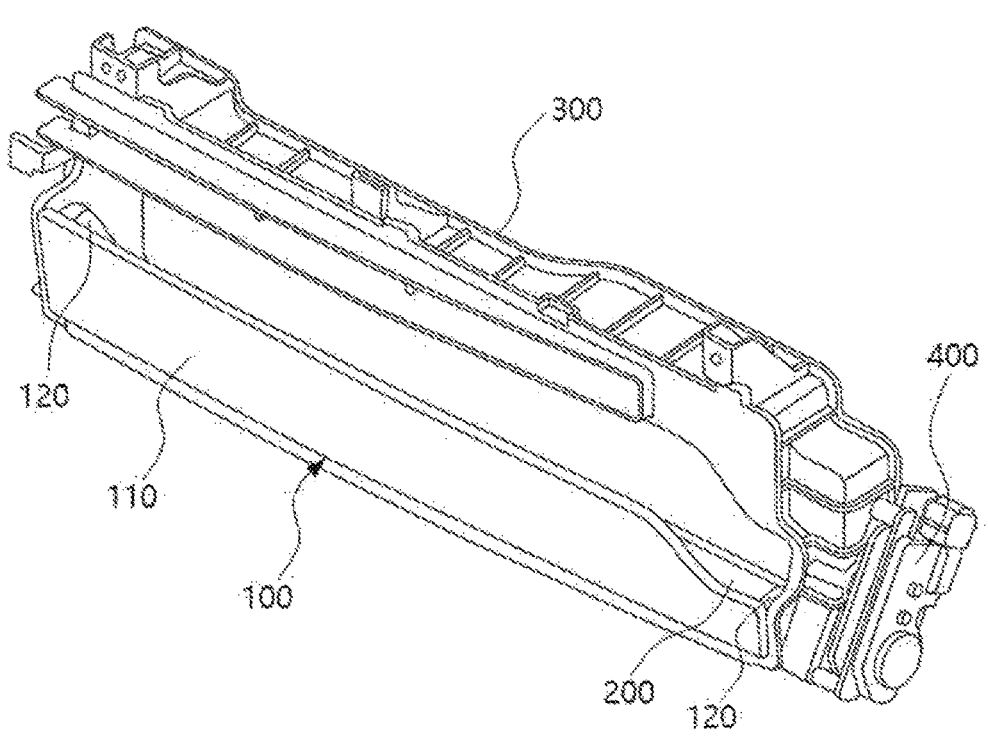
FIGS. 4 to 6 are an assembled perspective view, a front view, and an exploded perspective view, each showing a closed door of an active air flap according to a first embodiment of the present invention.
Figure 5:
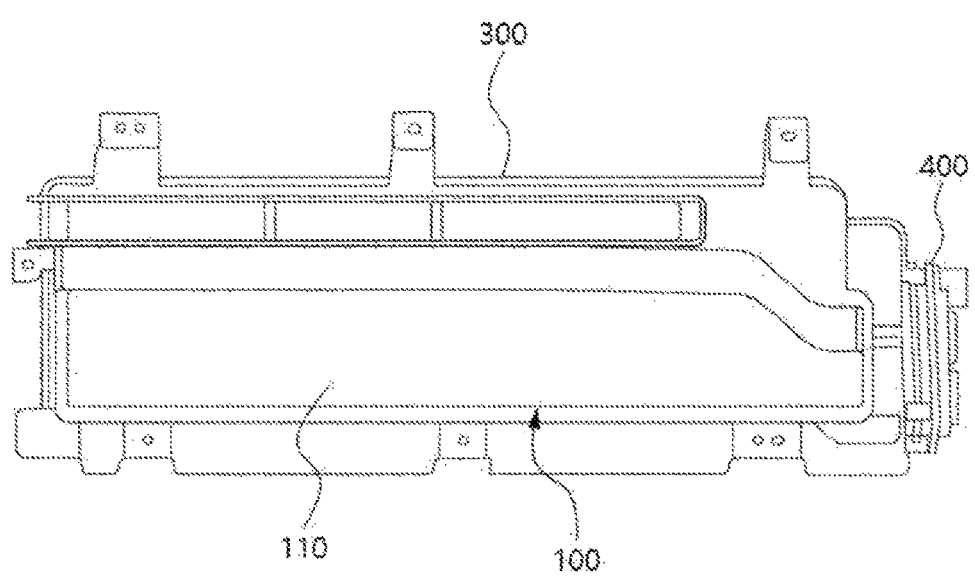
Figure 6:
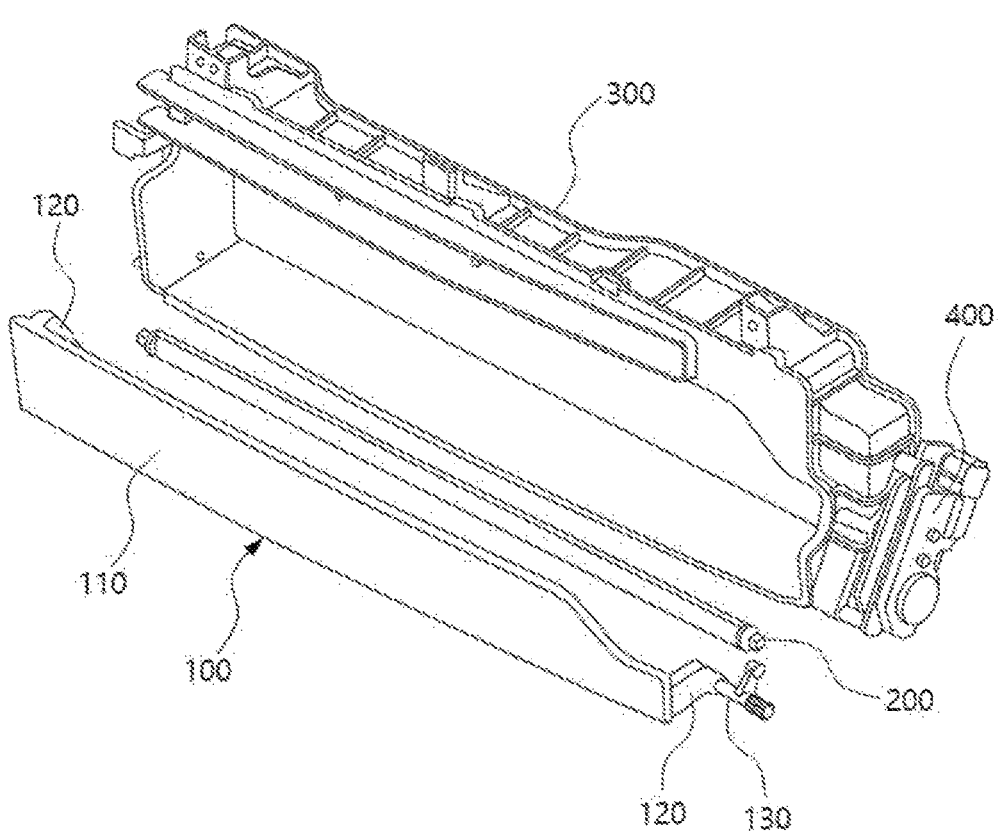
Figure 7:
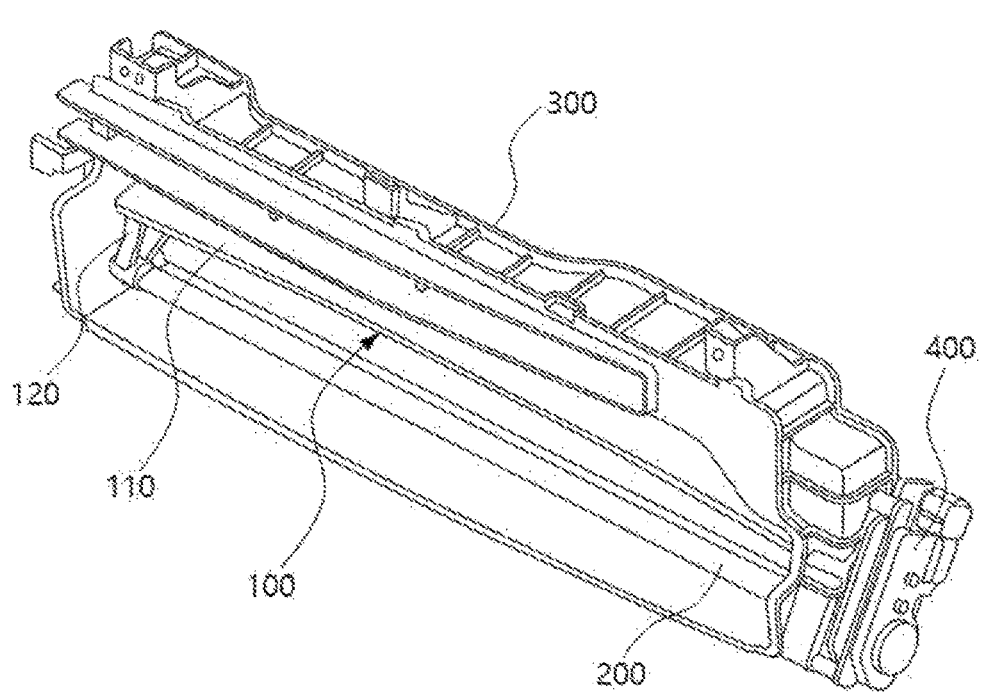
FIGS. 7 and 8 are an assembled perspective view and a front view, each showing an opened door of the active air flap according to a first embodiment of the present invention.
Figure 8:
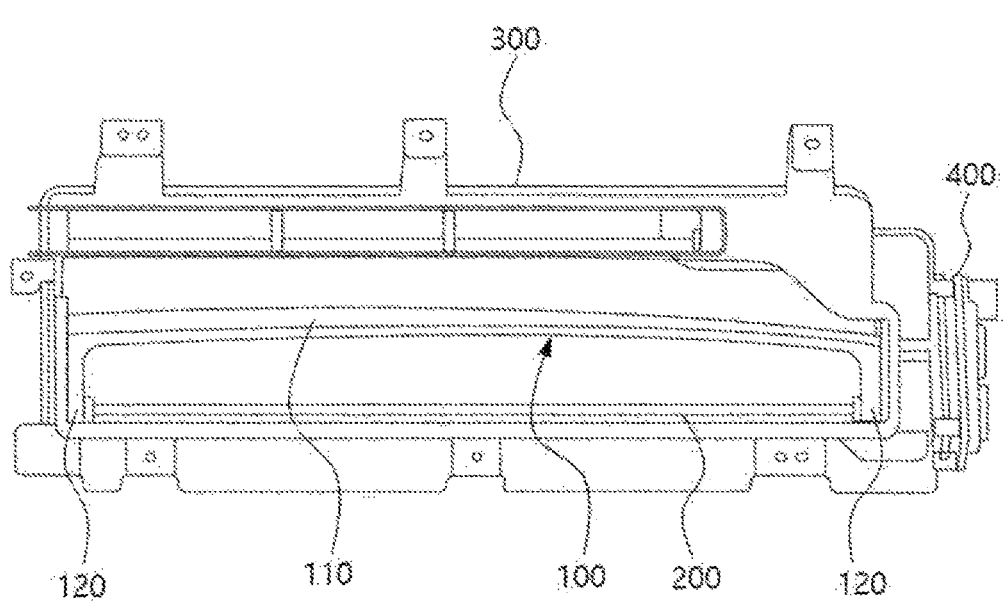
Figure 9:
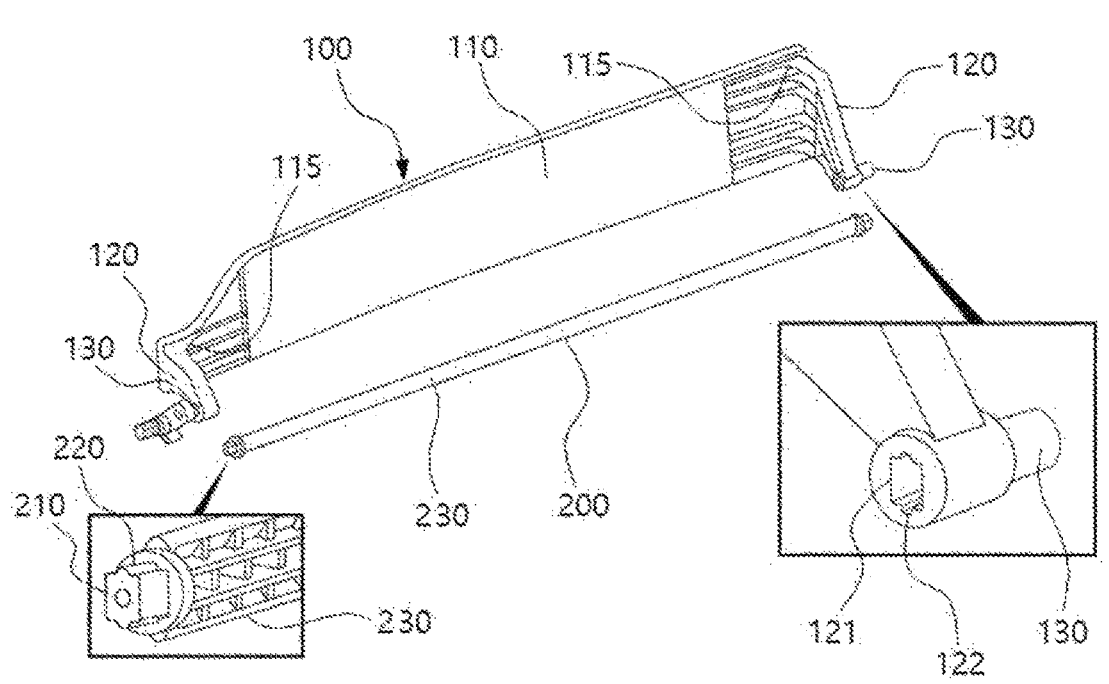
FIGS. 9 and 10 are an exploded perspective view and an assembled perspective view, g the door and twist prevention member of the active air flap according to a first embodiment of the present invention.
Figure 10:
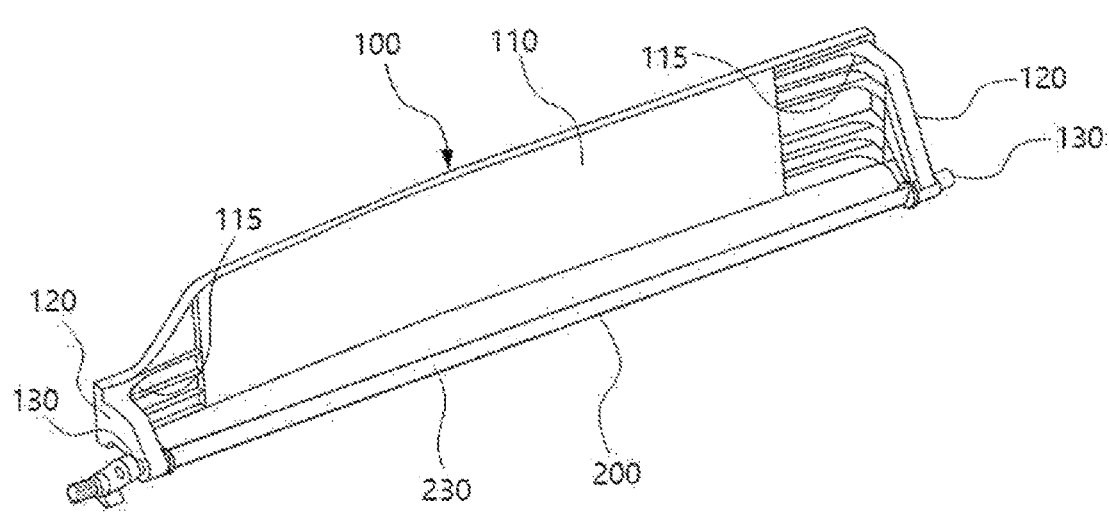

FIG. 3 is a perspective view showing a pair of active air flaps disposed symmetrically to each other according to an embodiment of the present invention; FIGS. 4 to 6 are an assembled perspective view, a front view, and an exploded perspective view, each showing a closed door of an active air flap according to a first embodiment of the present invention; FIGS. 7 and 8 are an assembled perspective view and a front view, each showing an opened door of the active air flap according to a first embodiment of the present invention; and FIGS. 9 and 10 are an exploded perspective view and an assembled perspective view, each showing the door and twist prevention member of the active air flap according to a first embodiment of the present invention.

First, as shown in FIG. 3, the pair of active air flaps according to an embodiment of the present invention may each have a length in the longitudinal direction greater than its length in the height or width direction, and the pair of active air flaps may be disposed symmetrically to each other. Hereinafter, the description describes one active air flap disposed on the right side.

As shown in the drawings, the active air flap according to a first embodiment of the present invention may mainly include a door 100 and a twist prevention member 200, and further include an air duct 300 and an actuator 400. Hereinafter, the description describes its configuration as including all of the door 100, the twist prevention member 200, the air duct 300, and the actuator 400.

The door 100 may serve to open or close the air duct 300 by being connected to the actuator 400 to be pivoted. The door 100 may include a barrier part including a barrier plate 110 and a pair of extension parts 120, and a pair of rotating shafts 130. The barrier plate 110 may be formed in a rectangular plate shape and have a substantially rectangular plate shape having a length greater than a width. In addition, the barrier plate 110 may be formed in various flat or curved shapes based on a shape of the air duct 300, and have a thin plate shape in which its thickness is smaller than its width or length. In addition, in order for an improved structural strength of the barrier plate 110, various types of ribs, such as a lattice type or a honeycomb type, may be positioned on a surface of the barrier plate that is opposite to its side (an inner surface of the barrier plate) to which air is introduced. The extension parts 120 may respectively extend in the thickness direction from both ends of the barrier plate 110 in the longitudinal direction, which is a long side direction, thus providing the pair of extension parts 120. In addition, each of the extension parts 120 may have one end that is fixed to the barrier plate 110 and the other end that is a free end. In addition, a reinforcing rib 115 connecting the barrier plate 110 and the extension part 120 with each other may be positioned inside a portion where the barrier plate 110 and the extension part 120 meet each other to improve the structural strength. The rotating shafts 130 may each extend outward from the free end of each of the pair of extension parts 120 in the longitudinal direction to provide the pair of rotating shafts 130.

The twist prevention member 200 may be disposed on a central axis connecting the pair of rotating shafts 130 with each other, coupled to the pair of extension parts 120 11, and serve to prevent twist deformation of the barrier plate 110 of the door 100 from occurring due to wind pressure of air flowing therethrough. The twist prevention member 200 may have one end in the longitudinal direction that is coupled to one extension part 120 and the other end in the longitudinal direction that is coupled to the other extension part. In addition, the twist prevention member 200 may be made of a material and structure having sufficient twist rigidity, and have various cross-sectional structures such as circular, polygonal, and elliptical shapes. In addition, the twist prevention member 200 may be coupled to the extension part 120 in various ways. For example, an insertion part 210 having a polygonal cross-sectional shape may be positioned at each of two ends of a body part 230 of the twist prevention member 200 in the longitudinal direction, and a coupling groove 121 having a shape corresponding to that of the insertion part 210 may be positioned in each of opposite surfaces of the pair of extension parts 120 of the door 100. Here, the reason why the insertion part 210 has the polygonal cross-sectional shape and the coupling groove 121 has a cross-sectional shape corresponding to that of the insertion part 210, is to prevent the twist prevention member 200 from rotating regardless of the door 100, thereby allowing the twist prevention member 200 to be interlocked with the twist prevention member 200 to rotate as the door 100 rotates. In addition, the coupling groove 121 of the door 100 may be positioned in a surface of the extension part 120 that is opposite to the position of the rotating shaft 130 in the longitudinal direction, thereby more effectively preventing twist deformation of the door. Therefore, the pair of extension parts 120 may be slightly spread outward in the longitudinal direction, the insertion part 210 of the twist prevention member 200 may then be inserted into and coupled to the coupling groove 121 of the extension part 120 in the longitudinal direction, the twist prevention member 200 may be coupled to the door 100, the door 100 may then be restored to its original shape by elasticity, and the two ends of the twist prevention member 200 in the longitudinal direction may thus be coupled and fixed to the pair of extension parts 120. Accordingly, the twist deformation of the door 100 may be prevented by the twist prevention member 200 even when a force to twist the door 100 acts around the rotating shaft 130 positioned on each of two sides of the door 100 in the longitudinal direction while the twist prevention member 200 is coupled to the door 100. In addition, a distance between the pair of extension parts 120 of the door 100 may be gradually smaller from its fixed end connected to the barrier plate 110 to its free end. Accordingly, the twist prevention member 200 may be securely fixed to the door 100 by the elasticity of the door 100, and thus be prevented from being separated.

In addition, it may be determined whether to use the twist prevention member 200 based on the length or thickness of the door 100, and to this end, the twist prevention member 200 may be provided separately from the door 100 to be disassembled from each other or assembled to each other. For example, the door 100 and the twist prevention member 200 may each be made of a resin material and injection-molded to be separable from each other. It is thus possible to prevent deformation of the twist prevention member 200 together with that of the door 100 when the door 100 is partially deformed.

In addition, the body part 230 of the twist prevention member 200 may have an outer diameter greater than that of the insertion part 210, thus limiting a depth at which the insertion part 210 is inserted into the coupling groove 121 and securing the sufficient rigidity of the twist prevention member 200.

In addition, a guide rib 220 may protrude from the insertion part 210 of the twist prevention member 200, a guide groove 122 having a shape corresponding to that of the guide rib 220 and connected to the coupling groove 121 may be positioned in the extension part 120 of the door 100, and the guide rib 220 may be inserted into and coupled to the guide groove 122. Therefore, a direction of the twist prevention member 200 may be accurately adjusted when the insertion part 210 of the twist prevention member 200 is inserted into the coupling groove 121 of the extension part 120, thereby preventing misassembly of the door and the twist prevention member. That is, in the twist prevention member 200, the body part 230 between the insertion parts 210 positioned on both sides of the twist prevention member in the longitudinal direction may be disposed in a space where air flows. Here, the cross-section of the twist prevention member 200 may have the elliptical shape to minimize air flow disturbance while securing the sufficient twist rigidity, and a long side of the elliptical cross-section may be disposed parallel to the barrier plate 110. Therefore, the misassembly of the door 100 and the twist prevention member 200 may be prevented by the guide rib 220 and the guide groove 122. In addition, the guide rib 220 and the guide groove 122 may have various shapes, positions, and numbers other than those shown in the drawings. In addition, when the door 100 is blocked, the twist prevention member 200 may be disposed behind the barrier plate 110 while being spaced apart therefrom in an air flow direction of a vehicle, thereby minimizing the air flow disturbance. That is, the door may be affected by the wind pressure of an outside air when the door is closed. However, the twist prevention member may not be subjected to the wind pressure by the barrier part, thus stably support the door.

The air duct 300 may serve to guide the air flow. The air duct 300 may have a shape of a case having both sides open, and have various shapes as long as air is introduced through one open side and air passing through the inside is discharged through the other open side. In addition, an assembly of the door 100 and the twist prevention member 200 may be provided and mounted inside the air duct 300, a through hole passing through each of two sides of the air duct 300 in the longitudinal direction may be positioned to correspond to each of the pair of rotating shafts 130 of the door 100, the rotating shaft 130 may be inserted into the through hole, and the door 100 may thus be rotatably coupled to the air duct 300.

The actuator 400 may be connected to the door 100, and operate to adjust a rotation angle of the door 400. That is, the actuator 400 may open or close the air duct 300 by rotating the door 100, and may adjust its opening level. In addition, the rotation of the door 100 may be fixed while the actuator 400 is not operated. In addition, the actuator 400 may be coupled and fixed to the outside of the air duct 300, or the actuator 400 may be coupled to only the rotating shaft 130 positioned on one side of the door 100.

Accordingly, rotation of the rotating shaft 130 positioned opposite to the rotating shaft 130 coupled to the actuator 400 may also be resultantly restrained by the twist prevention member 200 connecting the rotating shafts 130 on both the sides of the door even when the actuator 400 is coupled to only the rotating shaft 130 positioned on one side of the door 100 and rotation of only the rotating shaft 130 positioned on one side is restrained. It is thus possible to prevent the twist deformation or abnormal opening of the door from occurring in a side of the active air flap that is opposite to its side where the actuator is disposed base on the longitudinal direction by the wind pressure during high-speed driving of the vehicle in a state where the active air flap of the present invention is installed in the bumper opening or the like of the vehicle. In addition, a force may be applied by the twist prevention member 200 to reduce a difference in an amount of the rotation of the door when the other side of the freely-rotatable door 100 in the longitudinal direction is coupled to the actuator 400 to have the amount of rotation that is greater than one side of the restrained door 100 (i.e., the door is deformed or abnormally opened by the wind pressure).

Figure 11:
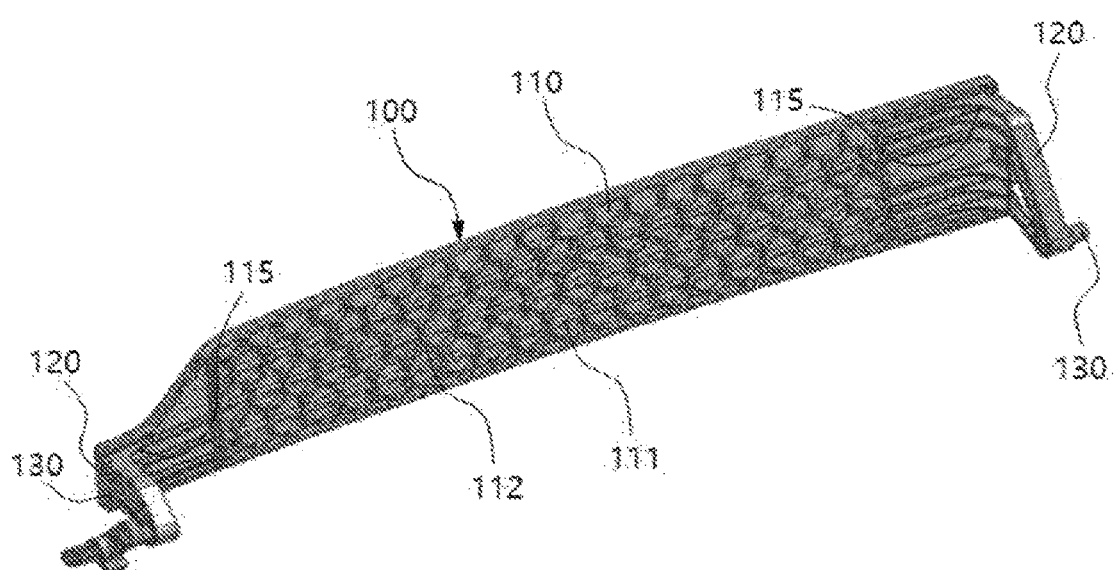
FIG. 11 is a perspective view showing an example in which ribs are positioned on an inner surface of a barrier plate included in the door of the active air flap according to a first embodiment of the present invention.

FIG. 11 is a perspective view showing an example in which the ribs are positioned on the inner surface of the barrier plate included in the door of the active air flap according to a first embodiment of the present invention.

As shown in the drawing, a first rib 111 and a second rib 112 may each protrude from the inner surface of the barrier plate 110 in a thickness direction of the barrier plate 110 to reinforce its structural strength. In addition, the first rib 111 may extend in the longitudinal direction, and the plurality of first ribs 111 may be spaced apart from each other in the vertical direction. In addition, the second ribs 112 may be connected to the plurality of first ribs 111, and for example, the second rib 112 may have a honeycomb shape. The first rib 111 and the second rib 112 may have various other shapes. In addition, the first rib 111 and the second rib 112 may be connected to the reinforcing rib 115.

Figure 12:
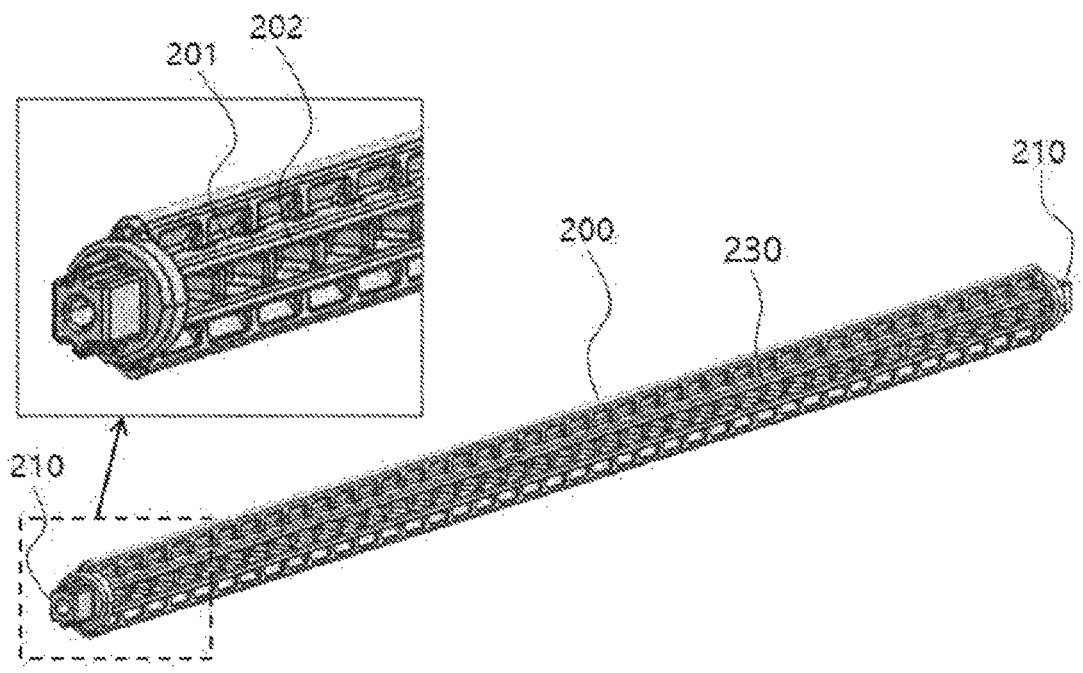
FIG. 12 is a perspective view showing an example of the twist prevention member of the active air flap according to a first embodiment of the present invention.

FIG. 12 is a perspective view showing an example of the twist prevention member of the active air flap according to a first embodiment of the present invention.

As shown in the drawing, the twist prevention member 200 may include a plurality of transverse ribs 201 extending in the longitudinal direction and a plurality of longitudinal ribs 202 connecting the plurality of transverse ribs 201 to each other. Here, the plurality of transverse ribs 201 may be provided, the plurality of transverse ribs 201 may be vertically spaced apart from each other, and some of the transverse ribs 201 may be integrally formed with each other by being connected to each other. In addition, the longitudinal rib 202 may connect the adjacent transverse ribs 201 to each other, and the plurality of longitudinal ribs 202 may be spaced apart from each other in the longitudinal direction.

Second Embodiment

Figure 13:
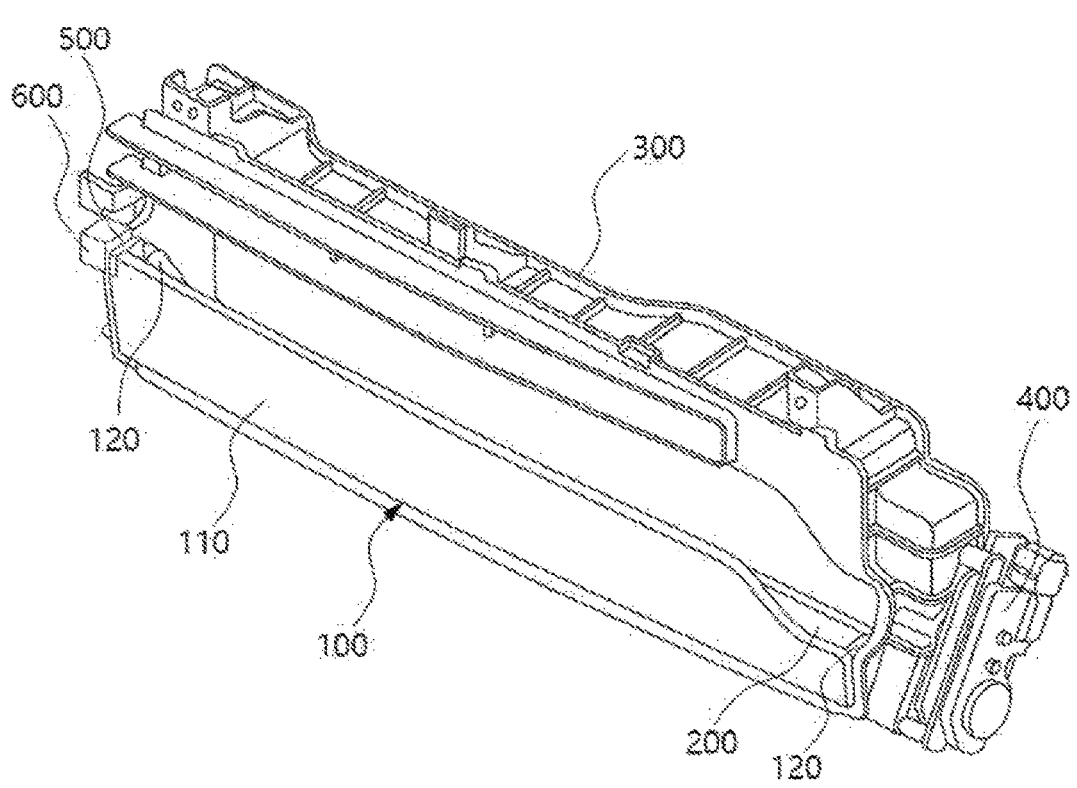
FIGS. 13 to 15 are an assembled perspective view, a partial perspective view, and a partial front view, each showing a closed door of an active air flap according to a second embodiment of the present invention.
Figure 14:
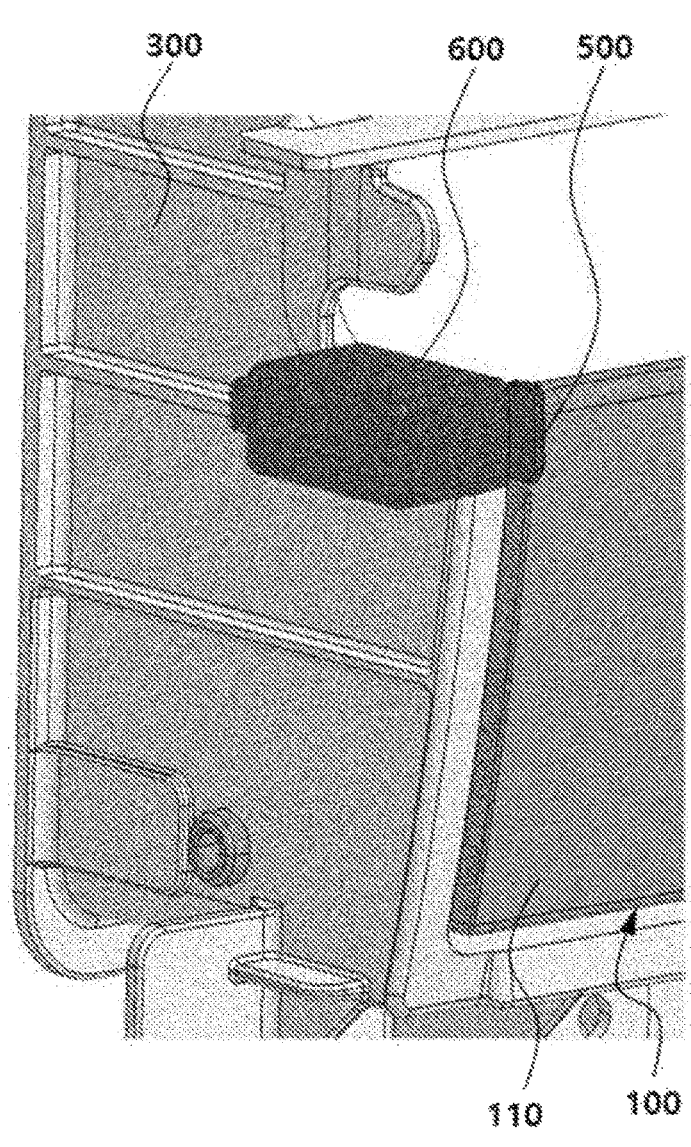
Figure 15:
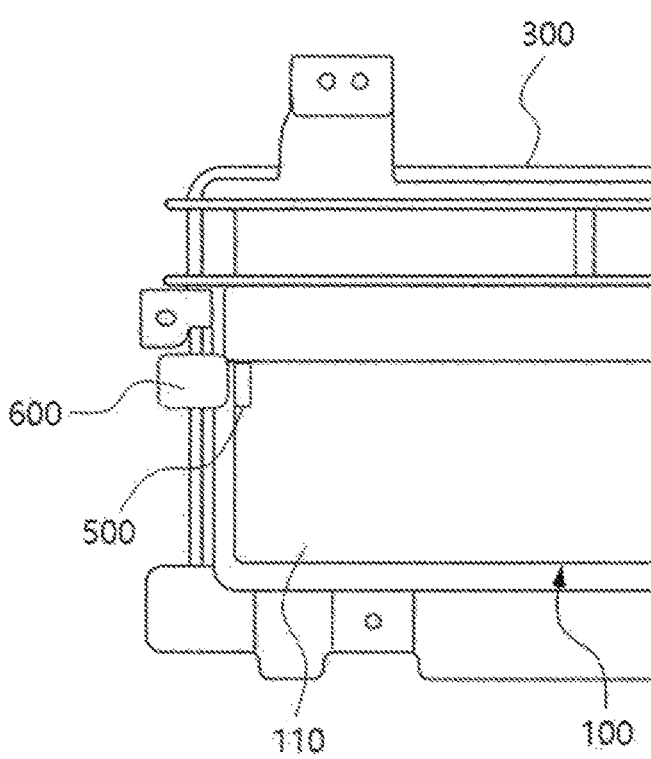

FIGS. 13 to 15 are an assembled perspective view, a partial perspective view, and a partial front view, each showing a closed door of an active air flap according to a second embodiment of the present invention.

As shown in the drawings, the active air flap according to the second embodiment of the present invention may mainly include a door 100, an air duct 300, a permanent magnet 500, and an electromagnet 600, and further include an actuator 400 and a twist prevention member 200. Hereinafter, the description describes its configuration as including all of the door 100, the twist prevention member 200, the air duct 300, the actuator 400, the permanent magnet 500, and the electromagnet 600.

The door 100, the twist prevention member 200, the air duct 300, and the actuator 400 may be formed in the same manner as in a first embodiment described above.

The permanent magnet 500 may be spaced apart from a rotational center of a rotating shaft 130 of the door 100, and the permanent magnet 500 may be coupled and fixed to the barrier plate 110 or extension part 120 of the door 100. For example, the permanent magnet 500 may be fixed to the extension part 120 on one side of the door in the longitudinal direction and positioned on an outer surface of the extension part 120 in the longitudinal direction. In addition, the permanent magnet 500 may be fixed to the door 100 in various ways.

The electromagnet 600 may serve to prevent movement of the permanent magnet 500 by allowing a solenoid to be operated to generate a magnetic force when current is applied thereto and by generating an attractive force that attracts the permanent magnet 500 by the magnetic force of the electromagnet 600. The electromagnet 600 may be disposed adjacent to the permanent magnet 500 while the door 100 is completely closed, and the electromagnet 600 is coupled and fixed to the air duct 400. In addition, the electromagnet 600 may be spaced apart from the permanent magnet 500 and the door 100 to have a slight gap.

Here, the permanent magnet 500 and the electromagnet 600 may be disposed on the other side of the air duct 300 in the longitudinal direction that is opposite to one side of the air duct in the longitudinal direction where the actuator 400 is disposed to respectively be coupled to the door 100 and the air duct 300. That is, the rotation of the door 100 may be constrained because the rotating shaft 130 is positioned on one side of the door in the longitudinal direction and coupled to the actuator 400, and accordingly, the door 100 may not be easily deformed by the wind pressure. On the other hand, the rotating shaft 130 may freely rotate on the other side of the door 100 in the longitudinal direction. However, the rotation of the other side of the door 100 in the longitudinal direction may be restrained by the permanent magnet 500 coupled to the other side of the door 100 in the longitudinal direction and the electromagnet 600 positioned to correspond to the position of the permanent magnet and coupled to the air duct 300.

Accordingly, the rotation or deformation of the door 100 may be prevented by operating the electromagnet 600 to pull the permanent magnet 500 when the door 100 is closed, and the door 100 may easily rotate by stopping the operation of the electromagnet 600 when the door 100 needs to be opened.

The present invention is not limited to the above-described embodiments, and may be variously applied. In addition, the present invention may be variously modified by those skilled in the art to which the present invention pertains without departing from the gist of the present invention claimed in the claims.

DESCRIPTION OF REFERENCE NUMERALS

100: door, 110: barrier plate, 111: first rib 112: second rib, 115: reinforcing rib, 120: extension part
121: coupling groove, 122: guide groove, 130: rotating shaft
200: twist prevention member, 201: transverse rib, 202: longitudinal rib 210: insertion part, 220: guide rib, 230: body part
300: air duct, 400: actuator, 500: permanent magnet
600: electromagnet

The invention claimed is:

1. An active air flap comprising:
a door including a barrier part capable of blocking a flow of air introduced from a front of a vehicle, and a pair of rotating shafts respectively positioned at both free ends of the barrier part in a longitudinal direction; and
a twist prevention member disposed on a central axis connecting the pair of rotating shafts with each other, and having one end in the longitudinal direction that is coupled to one side of the barrier part in the longitudinal direction and another end in the longitudinal direction that is coupled to another side of the barrier part in the longitudinal direction, wherein the door and the twist prevention member are separately provided, and the door and the twist prevention member are configured to be disassembled from each other or assembled to each other, and wherein an insertion part having a polygonal shape is positioned at each of two ends of a body part of the twist prevention member in the longitudinal direction, a coupling groove corresponding to a cross-sectional shape of the insertion part is positioned in each of opposite surfaces of both sides of the barrier part of the door in the longitudinal direction, and the insertion part of the twist prevention member is inserted into and coupled to the coupling groove.

2. The active air flap of claim 1, wherein the body part of the twist prevention member has an outer diameter greater than that of the insertion part.

3. The active air flap of claim 1, wherein a guide rib protrudes from the insertion part of the twist prevention member, a guide groove corresponding to the guide rib is positioned in the coupling groove of the barrier part, and the guide rib is inserted into and coupled to the guide groove.

4. The active air flap of claim 1, wherein the twist prevention member includes a plurality of transverse ribs extending in the longitudinal direction and a plurality of longitudinal ribs connecting the plurality of transverse ribs to each other.

5. The active air flap of claim 1, wherein the barrier part of the door includes a barrier plate having a plate shape and a pair of extension parts respectively extending in a thickness direction from both sides of the barrier plate in the longitudinal direction, and the rotating shaft is positioned at each free end of the pair of extension parts.

6. The active air flap of claim 5, wherein when the door is blocked, the twist prevention member is disposed behind the barrier plate.

7. An active air flap comprising:
a door including a barrier part capable of blocking a flow of air introduced from a front of a vehicle, and a pair of rotating shafts respectively positioned at both free ends of the barrier part in the longitudinal direction; and
a twist prevention member disposed on a central axis connecting the pair of rotating shafts with each other, and having one end in the longitudinal direction that is coupled to one side of the barrier part in the longitudinal direction and the other end in the longitudinal direction that is coupled to the other side of the barrier part in the longitudinal direction, wherein the barrier part of the door includes a barrier plate having a plate shape and a pair of extension parts respectively extending in the thickness direction from both sides of the barrier plate in the longitudinal direction, wherein the rotating shaft is positioned at each free end of the pair of extension parts, and
wherein an insertion part having a polygonal shape is positioned at each of two ends of the twist prevention member in the longitudinal direction, a coupling groove corresponding to a cross-sectional shape of the insertion part is positioned in each of opposite surfaces of the extension parts positioned on both sides of the door in the longitudinal direction, and the insertion part of the twist prevention member is inserted into and coupled to the coupling groove of the extension part.

8. The active air flap of claim 7, wherein the coupling groove is positioned in a surface that is opposite to a position of the rotating shaft in the longitudinal direction.

9. The active air flap of claim 7, wherein the door and the twist prevention member are each made of a resin material and injection-molded to be separable from each other.

10. The active air flap of claim 7, wherein a distance between the extension parts opposing each other at a position where the coupling grooves of the extension parts positioned on both the sides of the door in the longitudinal direction are positioned is smaller than a length of a body part of the twist prevention member, and the pair of extension parts is spread outward in the longitudinal direction, the twist prevention member is then inserted into the coupling groove, and both sides of the twist prevention member in the longitudinal direction are thus coupled and fixed to the pair of extension parts.

11. The active air flap of claim 10, wherein the pair of extension parts of the door has a distance that is gradually smaller from a fixed end that is connected to the barrier plate to the free end.

12. The active air flap of claim 5, wherein the door includes a reinforcing rib positioned inside a portion where the barrier plate and the extension part meet each other and connecting the barrier plate and the extension part with each other.

13. The active air flap of claim 5, wherein a plurality of first ribs extending in the longitudinal direction and a second rib connected to the plurality of first ribs protrude from an inner surface of the barrier plate of the door in the thickness direction.

14. The active air flap of claim 1, further comprising an air duct which has an inside through which air passes, in which the door and the twist prevention member are positioned, to which the pair of rotating shafts of the door is rotatably coupled, and which guides introduced air.

15. The active air flap of claim 14, further comprising an actuator fixed to the air duct, connected to the rotating shaft of the door, and operating to pivot the door for the air duct to be opened or closed.

16. The active air flap of claim 15, wherein one of the pair of rotating shafts that is positioned on one side of the barrier part in the longitudinal direction is coupled to and restrained by the actuator and, the rotating shaft positioned on the other side of the barrier part in the longitudinal direction is able to freely rotate.

17. The active air flap of claim 15, further comprising:

a permanent magnet coupled to the door while being spaced apart from the rotating shaft of the door; and an electromagnet disposed adjacent to the permanent magnet and fixed to the air duct.

18. The active air flap of claim 17, wherein the actuator is coupled to the rotating shaft positioned on one side of the door in the longitudinal direction or one side of the air duct in the longitudinal direction, and the permanent magnet and electromagnet are disposed on the other side of the door or air duct in the longitudinal direction and coupled thereto.

* * * * *